H. T. CRONK.
DESTRUCTIBLE CLOSET TRAP.
APPLICATION FILED NOV. 8, 1913, RENEWED MAY 24, 1919.
1,308,582.  Patented July 1, 1919.
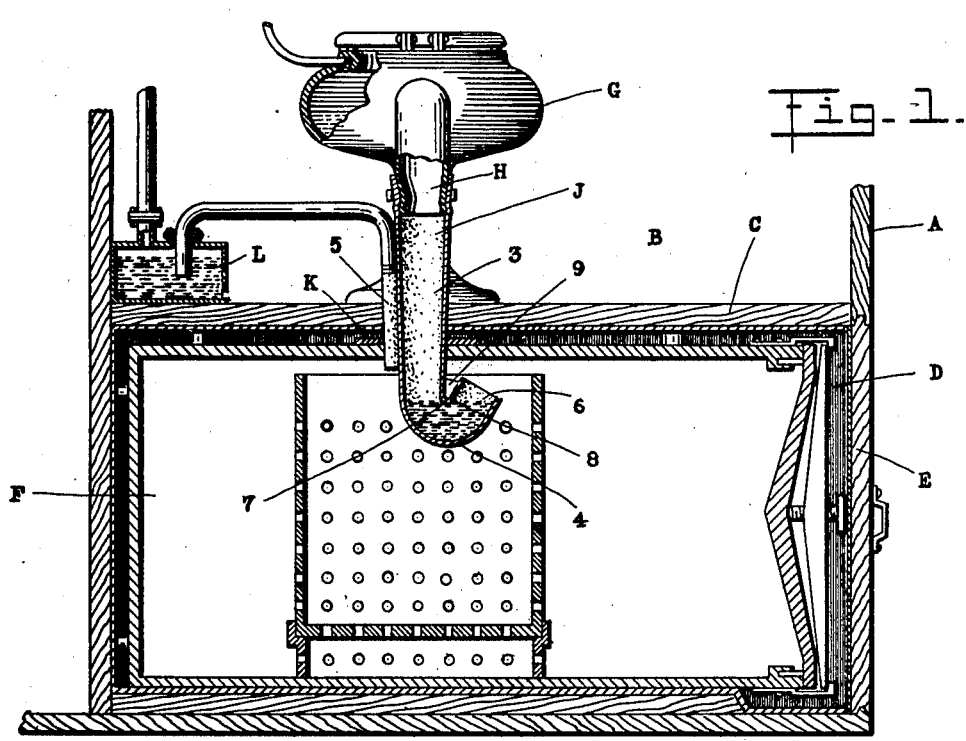
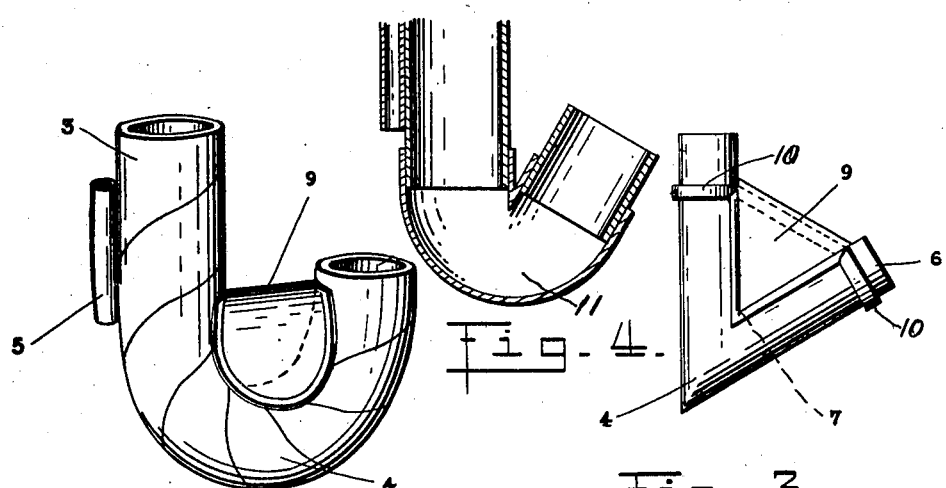
WITNESSES:
Howard R. King.
Sara Thornton
INVENTOR:
Harrison T. Cronk.
BY W. S. Orton
ATTORNEY.

UNITED STATES PATENT OFFICE.

HARRISON TAYLOR CRONK, OF NEW YORK, N. Y., ASSIGNOR TO CRONK-SALTER COMPANY, OF NEW YORK, N. Y., A CORPORATION OF NEW YORK.

DESTRUCTIBLE CLOSET-TRAP.

1,308,582. Specification of Letters Patent. Patented July 1, 1919.

Application filed November 8, 1913, Serial No. 799,848. Renewed May 24, 1919. Serial No. 299,559.

*To all whom it may concern:*

Be it known that I, HARRISON TAYLOR CRONK, a citizen of the United States, and a resident of the city of New York, borough of Manhattan, in the county and State of New York, have invented a new and Improved Destructible Closet-Trap, of which the following is a full, clear, and exact description.

My invention relates to a new and improved fabric trap of general application, but particularly adapted for use in toilet closets.

In the system of collecting and disposing of refuse matter collected in water-closets especially in peripatetic closets on railroad trains, it has been found convenient to form the connection between the closet hopper and the storage tank into a trap of some inexpensive and readily destructible material, which trap may be thrown away or destroyed with each emptying of the tank or whenever the connection becomes contaminated.

I attain the above outlined object by attaching to a depending outlet pipe of a closet hopper one end of a fluid sealing trap, of a J, U, V or inverted A shape, composed of some readily destructible material, of a rigidity sufficient to retain its normal configuration and preferably of a fabric or composition that will be easily rendered unfit for repeated use.

Various other objects of the invention will be more fully set forth in the following description of one form of mechanism embodying the invention which consists in the new and novel features of construction and combination of parts hereinafter set forth and claimed.

Referring to the accompanying drawings:—

Figure 1 is a fragmentary transverse vertical sectional view through the lower portion of a toilet compartment of a railroad car, showing the installation of a preferred embodiment of my invention in position therein.

Fig. 2 is a perspective view of a modified form of trap.

Fig. 3 is a side elevational view of another modified form of trap, and

Fig. 4 is a vertical sectional view through a prefered form of trap.

In the drawings, I have disclosed a vehicle A having a closet compartment B, beneath the flooring C of which is a metal lined compartment D, access to which is obtained through the door opening E in the side of the car. Disposed within the compartment D is a suitable removable refuse tank F, the contents of which may be destroyed by chemicals, incineration or other suitable means for rendering bacteria innocuous. Disposed on the floor C is a suitable receiving hopper G, which has secured to the outlet pipe H thereof a trap J, which trap more particularly forms the subject-matter of this invention. The trap has a vertical leg which is disposed in suitable openings in the floor C and the tank F, and is sealed in said tank by a suitable gasket K to prevent gases passing from the tank.

Preferably forming a part of the trap is a conduit 5 forming a part of the connection leading from the interior of the tank to a suitable disinfector or wash bottle L, or a ventilator.

My improved trap is of a general J construction, having a vertical inlet arm or leg 3, and a crotch portion 4, either integral with the inlet arm or preferably formed of a separate cap. The outlet arm 6 from the crotch portion extends at a relatively sharp acute angle to the inlet arm so that the trap may be formed of the least amount of material and yet possess relatively wide mouths compared with the length of the arms.

It is of the essence of the invention that the trap and ventilating conduit be made of some readily destructible material or composition, preferably of fabric, such as waterproof paper, cardboard, or papier-mâché, flexible or collapsible, or both, and of a rigidity sufficient to maintain its shape to perform its function as a trap, and yet so constructed that it may be crushed to prevent its re-use.

It is, of course, obvious that it is within the limits of this invention to shorten one of the legs of the J trap to form a U, such as is shown in Fig. 2, or a V-shaped trap, such as is shown in Fig. 3, the V-shaped trap or a trap with a V-shaped crotch having a sharp angled internal edge 7 common to the legs 3 and 6, which edge projecting into fluid seal 8 forms an effective seal preventing the exodus of gas from the tank back into the hopper or toilet compartment.

The displaced gases in the tank pass through the conduit 5 into and through the wash bottle L, or out into the air, as is common with devices of this character.

The conduit 5 is preferably formed with the trap proper, or is made separately and fastened to the exterior of the pipe, as shown, by any suitable clip or adhesive, the trap with its attached conduit being sold as a single article of manufacture. It is obviously within the skill of the mechanic, in view of the disclosure, to construct the trap with the conduit within the outlines of the same, so that the opening into the tank may be circular in plan, thus insuring a better fitting gasket at this place.

As the trap is a relatively frail device, the weight of the fluid seal and the rush of the inflowing fluids, especially in that portion of the crotch formed by the outlet arm 6, is apt to bend the arm 6 downward and destroy the trap function of the connection. To reinforce the trap and to assist in transmitting the weight of fluid in the arm 6 to the vertical leg 5, there may be formed exteriorly of the trap and in the angle between the legs 3 and 6 a stiffening web or brace 9, triangular shape in elevation, preferably of the same material as the trap and formed integral therewith, or formed of a separate sheet suitably affixed to the adjacent parts of the trap. While a plain sheet is herein disclosed it may be found necessary to brace this sheet by binding the top edge with tension strips or bands 10, which bands may also encircle the legs of the trap, as shown in Fig. 3.

For convenience of manufacture the arms 3 and 6 may be telescoped within a crotch cap 11 as shown in Fig. 4, and affixed thereto by a suitable waterproofed adhesive or otherwise secured in place.

It will be understood that whenever desired the trap may be detached from the bowl or hopper, crushed out of shape and dropped or lowered into the tank, to be there rendered unfit for repeated use or the mere act of withdrawing the tank will cause the trap to be drawn away from the hopper, distorted and thus rendered unfit for further use. These traps are preferably destroyed by some suitable agent or method which will render its contamination non-infectious or non-contagious, and they can be destroyed or rendered innocuous at the same time that the contents of the tank is treated. A new or clean trap may then be inserted in place with the cleaned tank as by positioning the trap on the outlet pipe H through the open end of the tank F, thereby insuring a clean, sanitary connection exteriorly of the hopper.

As the trap is somewhat flexible it may be distorted sufficiently to set the same in place even should the openings in the tank and floor be such as to form a close fit about the traps when in place.

Having thus described my invention, I claim as new and desire to secure by Letters Patent:—

1. As an article of manufacture adapted to be partly inserted in a refuse tank, a trap adapted to contain a fluid in its crotch to form a fluid seal permitting ingress of matter to the tank and preventing the passage of gases through said trap, said trap having an open ended conduit forming a part thereof, adapted to permit the egress of gases from the tank.

2. As an article of manufacture, a trap adapted to form a fluid connection between a closet hopper and a refuse tank, said trap including a means adapted to constitute an outlet from the tank said outlet being independent of the first mentioned connection.

3. A J-shaped flexible and collapsible trap adapted to form a fluid seal, and comprising a short tubular member, a relatively longer tubular member, a connecting crotch cap, said trap having a consistency that will preserve its normal configuration while in use and a vent pipe affixed to said long tubular member.

In witness whereof I have hereunto set my hand in the presence of two witnesses.

HARRISON TAYLOR CRONK.

Witnesses:
 ANNA P. CRONK,
 MABEL S. LYOCE.

Copies of this patent may be obtained for five cents each, by addressing the "Commissioner of Patents, Washington, D. C."